United States Patent [19]
Loup

[11] 3,847,176
[45] Nov. 12, 1974

[54] TAMPER-PROOF CONTROL VALVE
[75] Inventor: Ronald L. Loup, Clarkston, Mich.
[73] Assignee: Double A. Products Co., Manchester, Mich.
[22] Filed: Sept. 25, 1972
[21] Appl. No.: 291,913

[52] U.S. Cl. .................................... 137/382, 49/38
[51] Int. Cl. ........................................... F16k 35/00
[58] Field of Search .............. 137/382, 382.5; 49/38

[56] References Cited
UNITED STATES PATENTS
| | | | |
|---|---|---|---|
| 2,084,995 | 6/1937 | Barlulesco | 49/38 X |
| 3,175,573 | 3/1965 | Vater | 137/382 X |
| 3,722,533 | 3/1973 | Connolly | 137/382 |

FOREIGN PATENTS OR APPLICATIONS
| | | | |
|---|---|---|---|
| 36,914 | 4/1909 | Austria | 49/38 |

Primary Examiner—Henry T. Klinksiek
Attorney, Agent, or Firm—Olsen & Stephenson

[57] ABSTRACT

Valve apparatus for use with hydraulic equipment to regulate selected characteristics of hydraulic fluid, such as its pressure, rate of flow, or the like. The valve apparatus is adjustable for setting the characteristic of the fluid at a selected magnitude and is constructed to prevent tampering with the adjusted setting. To adjust the setting it is necessary that at least a portion of the valve body be removed from the hydraulic equipment on which the valve body is mounted. The invention is shown in one form in a flow control valve and in another form in a pressure control relief valve.

16 Claims, 7 Drawing Figures

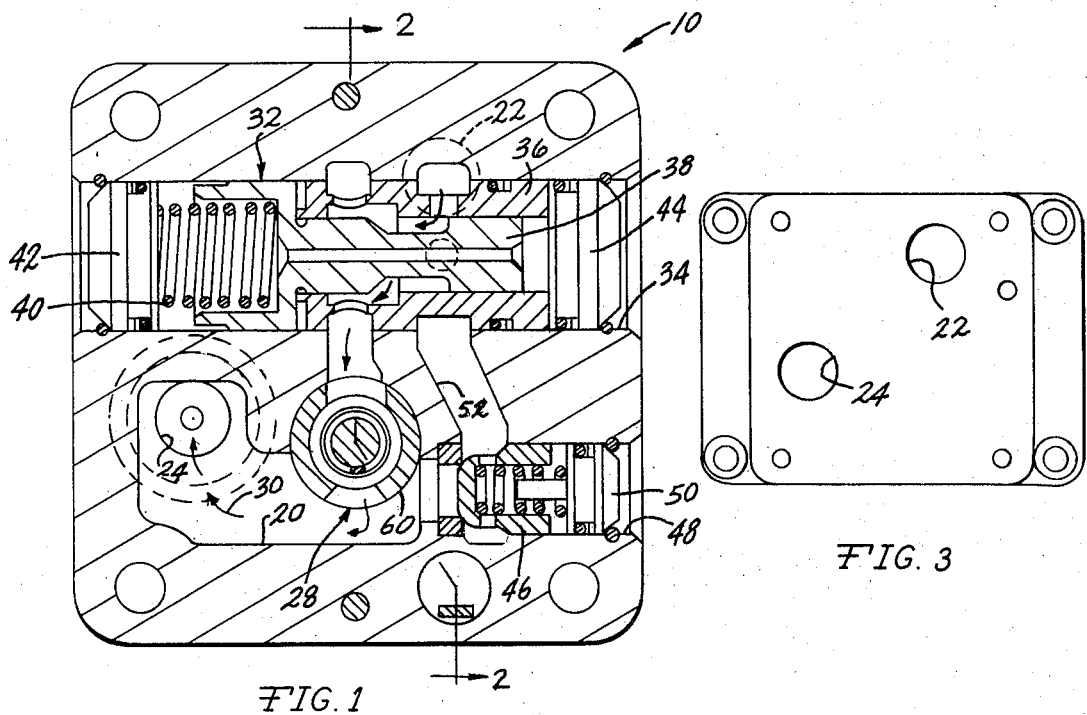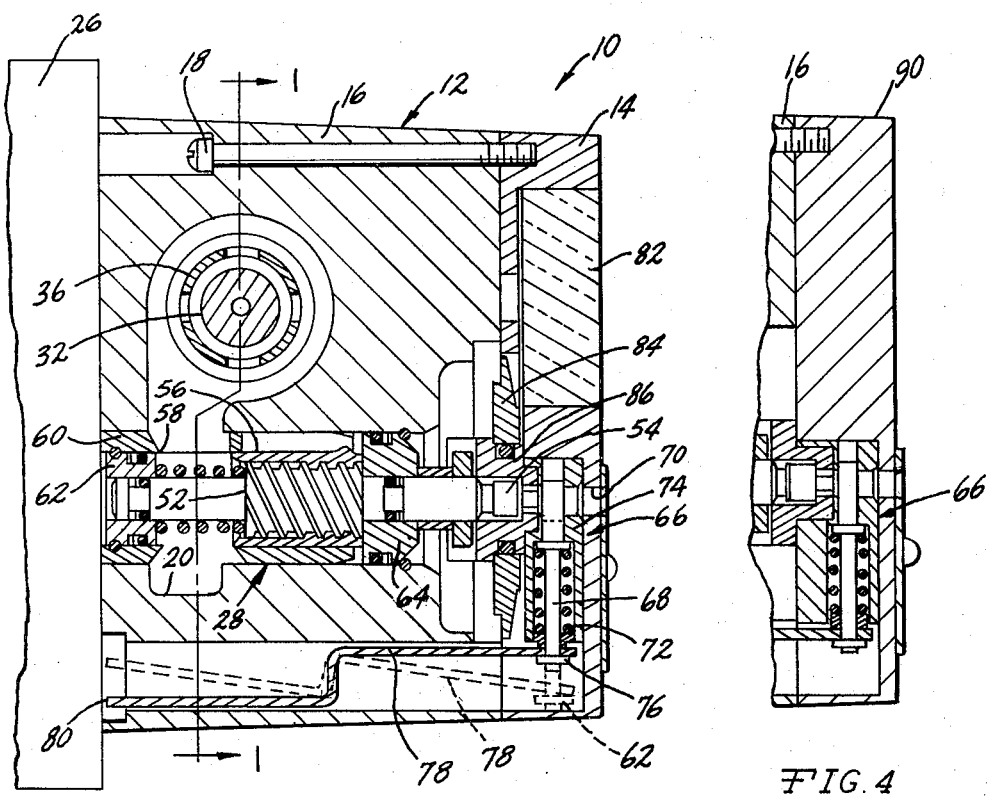

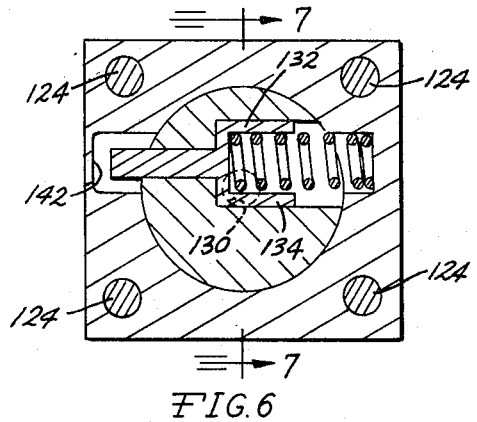
FIG.6
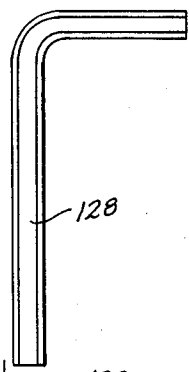
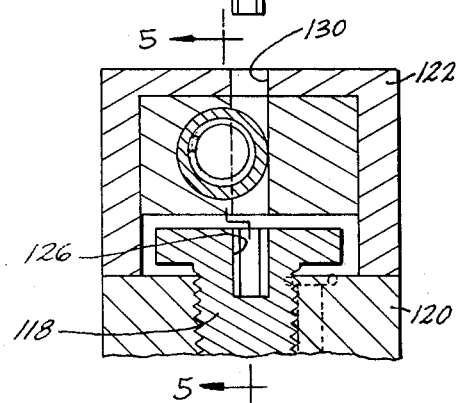
FIG.7
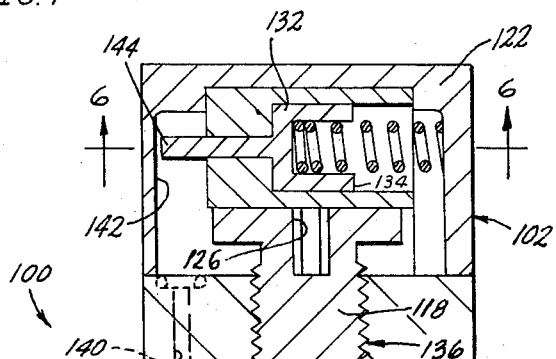
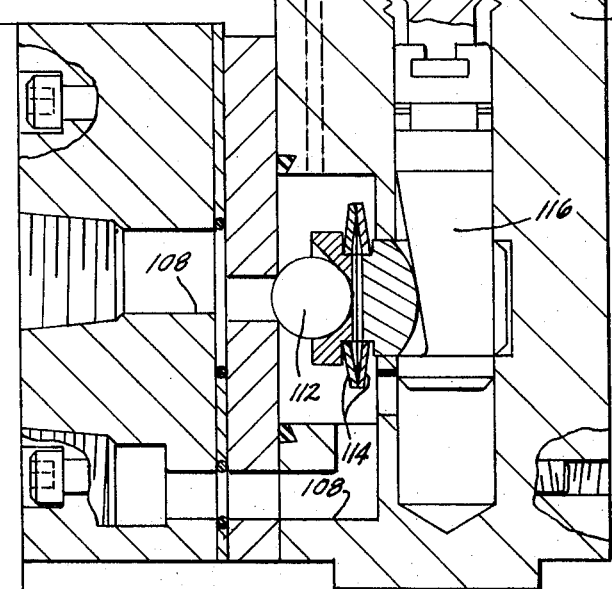
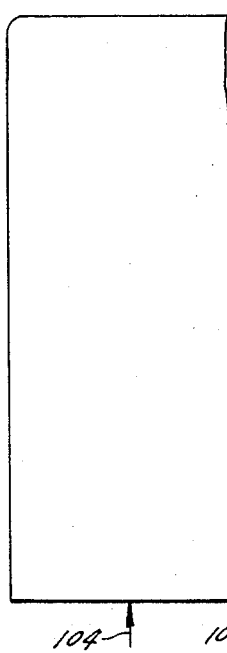
FIG.5

TAMPER-PROOF CONTROL VALVE

BACKGROUND OF THE INVENTION

The present invention relates to control valves for use with hydraulic equipment, and especially to such valves which are intended to maintain uniform operation of the hydraulic equipment within pre-established parameters.

It is common practice to operate machine tools and the like by means of hydraulic equipment and to regulate the output of the machine tools by using control valves which are connected in the hydraulic circuits of the hydraulic equipment to maintain a desired output. One of the problems faced by management is that employees are prone to tamper with the control valves for the purpose of slowing down or speeding up the output of the machine tools. Numerous ways have been tried to prevent tampering with the valves by the operators of the machine tools, but all such efforts have proved to be unsatisfactory. It has been found that all forms of prior art devices that have been installed on the control valves to prevent tampering have had only a temporary effect in preventing tampering with the control valves. It is found that the operators of the machine tools quickly find ways to circumvent the prior art devices on the control valves, thus preventing the machine tools from being operated at the proper speeds or output.

SUMMARY OF THE INVENTION

The present invention provides tamper-proof means for control valves which overcome the inadequacies of the prior art devices and which assure continuous use over long periods of time without danger of being tampered with by the operators of the machine tools. It is conventional in industry today to have work standards and union contracts which prevent operators of machine tools from disassembling the machine tools being operated, and such machine tools must be disassembled by workers of different classifications. The present invention provides tamper-proof control valves which operators will refuse to disassemble under the prevailing standards and work contracts.

According to one form of the present invention, a valve is provided which is adapted to be mounted on hydraulic apparatus for controlling selected characteristics of the hydraulic fluid in the apparatus. The valve comprises a valve body which has a passageway therein having an inlet and outlet port arranged so that the passageway is in the hydraulic circuit of the apparatus. Adjustment means are provided in the passageway for regulating a selected characteristic of the hydraulic fluid in the passageway. The adjustment means is adapted to be adjusted by a tool inserted into the valve body from a position outside the valve body. A tamper control means is in the valve body having a first position preventing insertion of the tool to the adjustment means and a second position wherein the tool can be inserted into position to actuate the adjustment means. The tamper control means is located within the valve body so that access to it for moving it to its second position can be gained only by removing at least a portion of the valve body from the apparatus. The tamper control means is responsive to removal of the tool from the inserted position to return to its first position. Thus, the valve cannot be readjusted unless it is removed or partially removed from the hydraulic apparatus with which it is associated, thereby requiring the operator to partially dismantle the valve if the adjustment is to be made.

Accordingly, it is an object of the present invention to provide an improved tamper-proof control valve which is constructed and arranged so that the operator of the apparatus with which it is used cannot alter the setting of the control valve without dismantling at least a part of the apparatus.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a sectional view taken on the line 1—1 of FIG. 2, showing a flow control valve embodying the present invention;

FIG. 2 is a sectional view taken on the line 2—2 of FIG. 1;

FIG. 3 is an elevational view of the mounting surface, drawn to reduced scale, of the valve illustrated in FIGS. 1 and 2;

FIG. 4 is a fragmentary sectional view, similar to that of FIG. 2, showing a modified form of the invention;

FIG. 5 is a side elevational view, partly in section, of a pressure control valve embodying the present invention;

FIG. 6 is a section taken on the line 6—6 of FIG. 5; and

FIG. 7 is a section taken on the line 7—7 o FIG. 6, showing a tool adapted to be used in adjusting the control valve.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the embodiment of the invention illustrated in FIGS. 1-3, inclusive, will be described. The flow control valve 10 has a valve body 12 which includes a cap 14 secured to the body portion 16 by means of a plurality of machine screws 18. A passageway 20 extends through said body 12 from an inlet port 22 to an outlet port 24 which are on the inner or mounting surface of the valve body 12. This surface is adapted to be mounted against an apparatus 26 which is operated by hydraulic fluid. The inlet and outlet ports 22 and 24 are located so that they will open to the hydraulic circuit in the apparatus 26 and be a part of the hydraulic circuit, whereby regulation of the flow of fluid through the passageway 20 will operate to control the operation of the apparatus 26.

Adjustment means 28 are provided in the passageway 20 for regulating the flow of hydraulic fluid through the passageway. In the normal operation of the flow control valve 10, the hydraulic fluid will enter through the inlet port 22 and will flow through the valve in the direction of the arrows 30 to the outlet port 24. The quantity of fluid that can flow through the valve is regulated by the setting of the adjustment means 28. Pressure compensating means 32 are provided for maintaining the flow substantially uniform. If it is desired to change the volume of flow of hydraulic fluid through the valve body 12, this can be accomplished by adjusting the setting of the adjustment means 28, in a manner which will be described.

The pressure compensating means 32 is mounted in the bore 34 and includes the sleeve 36, the movable spool 38 therein, the compression spring 40, and the O-ring plugs 42 and 44 on opposite ends of bore 34. The pressure compensating means 32 is conventional in construction and its operation will not be described in detail.

Also located in the flow constrol valve 10 is the spring-actuated poppet 46 which is retained in place in the bore 48 by means of the O-ring plug 50. The poppet 46 normally will maintain the bypass 52 closed and will operate to allow free reverse flow from port 24 to port 22.

The adjustment means 28 includes a spigot screw 52 that has an actuating end 54 adapted to receive an Allen wrench for turning the spigot screw 52. The spigot screw 52 is threadedly connected to the spigot 56 which is adapted to move axially relative to the screw 52 in response to turning of the latter. Axial movement of the spigot 56 will operate to vary the effective cross section of the port 58 in the spacer 60. Thus, varying the effective cross section of the port 58 will serve to vary the amount of hydraulic fluid that can flow through the passageway 20. The end of the spacer 60 is closed by the O-ring plug 62. Another O-ring plug 64 is positioned at the one end of the spigot 56 to limit its travel away from the port 58. From the above description, it will be understood that when the spigot screw 52 is turned by means of an Allen wrench or the like that is inserted into the end 54, the spigot 56 will move axially to vary the effective cross section of the port 58. Thus, this will regulate the flow of hydraulic fluid through the valve body 12.

To prevent tampering with the setting of the adjustment means 28, tamper control means 66 are included in the valve body 12, preventing insertion of an Allen wrench or the like into the end 54 of the adjustment means 28.

The tamper control means 66 includes a plunger or locking pin 68 that is positioned transversely of the hole 70 in the body 12. The plunger 68 is spring-biased by the spring 72 to its normally closed position in the hole 70 and it is retained in a plug 74. The plunger 68 has an enlarged head 76 at its one end and a lever 78 is connected to the enlarged head 76 so that it can retract the plunger 68 to the position shown in broken lines in FIG. 2. When this is done the lever 78 will also move to the broken line position shown in this figure.

It will be observed that the remote end 80 of the lever 78 is located within the valve body 12 so that the lever 78 can be actuated only by removal of the valve 10 from the apparatus 26. When this is done the plunger 68 can be retracted to its broken line position of FIG. 2, and an Allen wrench can then be inserted into the hole 70 and into the end 54 of the spigot screw 52. The valve 10 can then be remounted on the apparatus 26 and the apparatus can be placed in operation. The Allen wrench which still remains in the end 54 can then be used to adjust the rate at which the hydraulic fluid flows through the passageway 20. When a satisfactory flow has been realized, the Allen wrench can be removed, and the spring 72 will snap the plunger 68 back to the solid line position shown in FIG. 2, thereby preventing the Allen wrench from being reinserted into the end 54 for again tampering with the setting of the valve 10.

In the preferred embodiment of the invention illustrated in FIG. 2, the cap 14 includes a window plug 82 to provide visibility to the interior of the valve body 12. Located behind the window plug 82 is a dial indicator 84 which has dial markings (not shown) thereon so that when adjusting the setting of the adjustment means 28, reference can be made to the dial indicator 84. It will be observed that the dial indicator 84 is connected to the adjustment drive member 86 which is also adapted to be turned by the Allen wrench.

It will be understood that the present invention can be operated without the use of the window plug 82 and the dial indicator 84. A modified form of the present invention is shown in FIG. 4 wherein the tamper control means 66 is shown mounted in the modified cap 90 of this form of the invention. The adjustment of the adjustment means 28 will be carried out with reference to other data in determining when the setting of the adjustment means is appropriate.

Referring now to FIGS. 5–7, the embodiment of the invention shown therein will be described. In this form of the invention, the control valve is a pressure relief valve 100 in which the invention is embodied. The relief valve 100 is constructed and arranged essentially the same as that illustrated and described in U.S. Pat. No. 3,565,108, issued Feb. 23, 1971 to Charles E. Johnson. The essential difference in the present invention is the incorporation therein of the tamper control means 102. In this embodiment of the invention hydraulic fluid flows into the valve 100 at the arrow 104, and it returns to a reservoir at the arrow 106. A pressure relief passageway 108 is in communication with the passageway (not shown) between inlet 104 and 106 also for discharge back to the reservoir via the outlet 110. The passageway 108 includes the valve element 112 which is acted upon by the conical spring members 114. The setting of the ball and associated spring members 112 and 114 is established by means of the plunger 116, as is described in detail in the aforesaid U.S. Pat. No. 3,565,108. The setting is established by the axial position of the plunger 116, and in the present invention this is established by the amount that the threaded end member 118 is advanced into the valve body 120.

The valve body 120 includes the cap 122 which is secured to the remaining portion of the valve body 120 by the machine screws 124. The threaded member 118 has a socket 126 at its upper end adapted to receive an Allen wrench so that it can be turned to displace the plunger 116 in an axial direction. As can be seen in FIG. 7, an Allen wrench 128 is shown in alignment with hole 130 in the cap 122 for insertion into the socket 126. However, the Allen wrench 128 normally cannot be inserted into the socket 126 because of the presence of the plunger 132 that is spring-biased to the position shown in FIGS. 5 and 6. The plunger 132 is offset from the axis of the cap 122 so that when the enlarged portion 134 is displaced to the right, the wrench 128 can then be inserted into the hole 130 for adjusting the adjustment means 136.

The plunger 132 cannot be displaced to permit insertion of the Allen wrench 128 into the actuating end or socket 126 of the adjustment means 136 without removing the cap 122. Thus, it is necessary to disassemble the valve 100 if the operator is to tamper with the controls of the hydraulic apparatus. In communication with the passageway 108 is the duct 140 which will be opened to the atmosphere if the cover or cap 122 is removed while the hydraulic apparatus is in operation. Thus, again, a tamper-proof control means has been provided which cannot be actuated by the operator of the machine tool without disassembling part of the hydraulic circuit that is used to operate the machine tool. When adjustment is to be made, the cap 122 can be removed and a hand tool can be inserted into the slot 142 for engagement with the end 144 of the plunger 132 to displace it sufficiently far to the right to enable the Allen wrench 128 to be inserted into the socket 126 for adjustment purposes. Then the cap 122 can be remounted on the remainder of the body 120 and the hydraulic apparatus (not shown) restarted. The adjustment means 136 can then be adjusted after which the Allen wrench 128 can be removed from the tamper control means 102.

It is claimed:

1. A valve adapted to be mounted on hydraulic apparatus for controlling selected characteristics of the hydraulic fluid in said apparatus, comprising a valve body adapted to be mounted on said apparatus, a passageway in said body having an inlet port and an outlet port arranged so that said passageway is in the hydraulic circuit of said apparatus, adjustment means in said passageway for regulating a selected characteristic of the hydraulic fluid in said passageway, said adjustment means being adjustable by a tool inserted into the valve body from a position outside said valve body, and tamper control means in said valve body having a first position preventing insertion of said tool to said adjustment means and a second position wherein said tool can be inserted into position to actuate said adjustment means, said tamper control means being located in said valve body so that access to it for moving it to its second position can be gained only by removal of at least a portion of said valve body from said apparatus.

2. The valve that is defined in claim 1, wherein said tamper control means is responsive to removal of said tool from the inserted position to return to said first position.

3. The valve that is defined in claim 1, wherein said valve includes flow control means in association with said passageway, said adjustment means being operable to regulate the flow control means so that the characteristic of the hydraulic fluid that is regulated is its rate of flow.

4. The valve that is defined in claim 1, wherein said valve includes pressure control means in association with said passageway, said adjustment means being operable to regulate the pressure control means so that the characteristic of the hydraulic fluid that is regulated is its pressure.

5. The valve that is defined in claim 1, wherein removal of said portion of said valve body will open said passageway to the outside of said valve body.

6. The valve that is defined in claim 1, wherein said adjustment means has an actuating end and said valve body has a hole into which said tool can be inserted for engaging said actuating end for adjusting said adjustment means, and said tamper control means comprises a plunger biased to said first position, said plunger when in its first position passing through said hole to prevent said tool from being inserted into engagement with said adjustment means, said plunger when moved to its second position being out of said hole so that said tool can be inserted into engagement with said adjustment means.

7. The valve that is defined in claim 6, wherein said valve body includes a detachable cap with a hole overlying said actuating end of the adjustment means, said plunger being mounted for movement in said cap.

8. The valve that is defined in claim 7, wherein said cap can be removed only when the entire valve body is detached from said apparatus.

9. The valve that is defined in claim 8, wherein said tamper control means includes a lever extending through the valve body from the side adapted to be mounted on said apparatus to said cap, said lever being connected to said plunger for moving it to its second position.

10. The valve that is defined in claim 7, wherein said cap includes a slot that opens to the underside of the cap and leads to said plunger by which said plunger can be moved to its second position for inserting said tool through said hole.

11. The valve that is defined in claim 1, wherein said adjustment means includes indicator means indicating the setting of the adjustment means, said valve body including a window to permit viewing of the indicator means from outside said valve body.

12. A tamper proof closure for a valve or similar adjustable control device comprising a body having a mounting surface to be mounted against a suitable support, an adjustment shaft mounted in the body with an operative end facing the opposite surface of the body, means on the shaft to receive in non-rotational relation an adjusting tool, a cover for said opposite surface of the body secured thereto by a fastening means non-removable from the outside and having an access hole in line with the adjustment shaft, a closure member shiftable to close or open the access hole and biased to closed position, and shifting means accessible only from the mounting surface for opening the closure member to allow insertion of a tool to operate the adjustment shaft and temporarily hold the closure open against the bias.

13. A closure defined in claim 12 having a spring for holding closure closed after removal of the tool.

14. A closure as defined in claim 13 wherein the shifting means is effective to release the spring.

15. A closure defined in claim 1 wherein the shifting means comprises a swinging lever operable from the mounting surface of the body.

16. A closure defined in claim 15 wherein the closure comprises a slidable bar connected to the lever at one end and spring biased at the other end.

* * * * *